March 10, 1964     S. H. STRAND     3,124,030
BOLT STRUCTURE ADAPTED TO BE ANCHORED IN A
BORE HOLE ESTABLISHED IN ROCK
Filed May 26, 1960     2 Sheets-Sheet 2
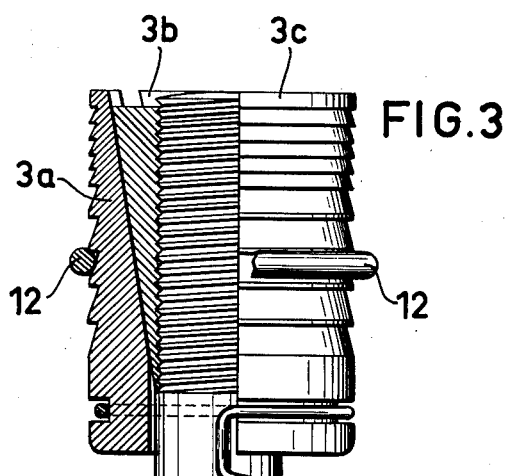
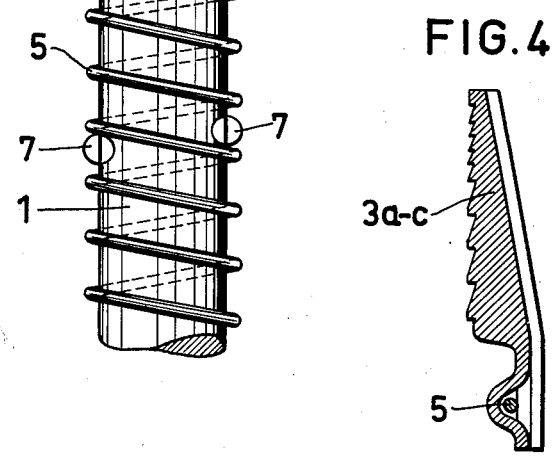
INVENTOR
Sven Hugo Strand
By
Pierce, Scheffler & Parker
Attorneys

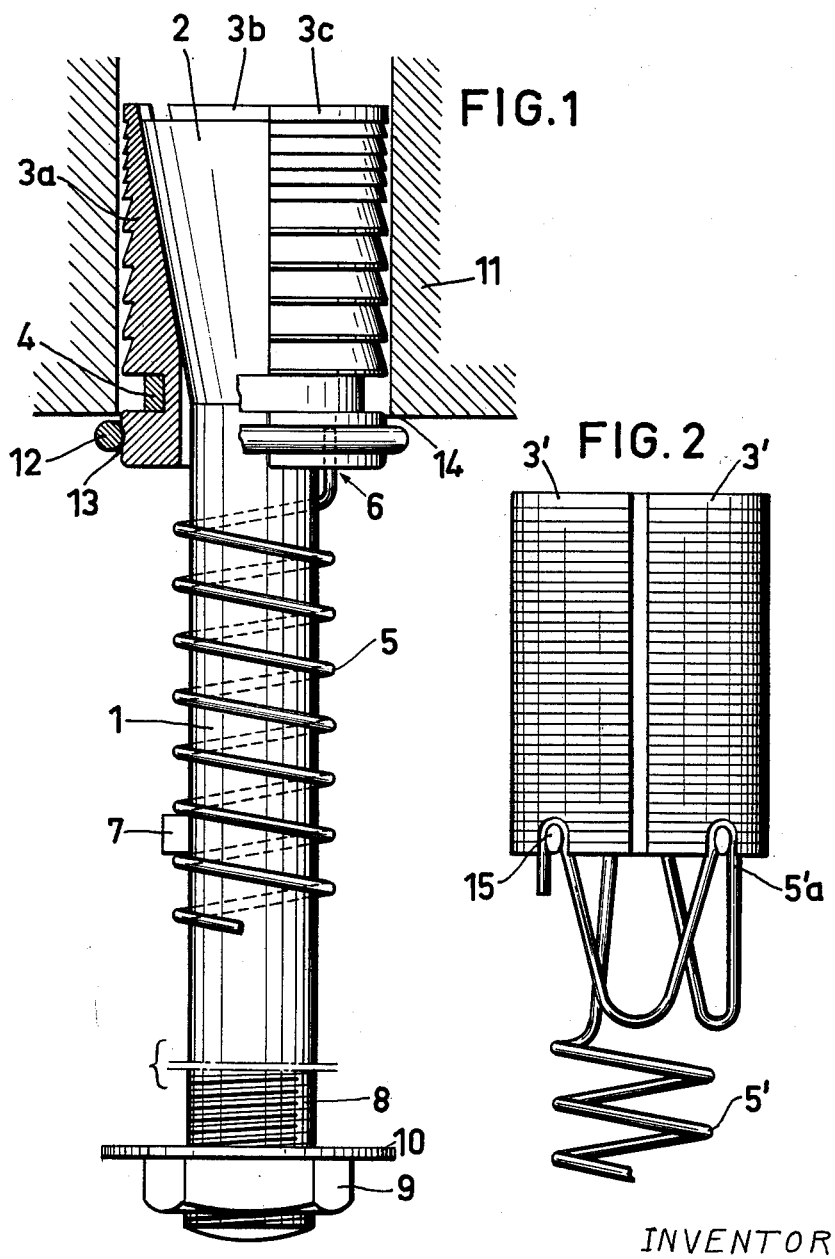

United States Patent Office 3,124,030
Patented Mar. 10, 1964

3,124,030
BOLT STRUCTURE ADAPTED TO BE ANCHORED IN A BORE HOLE ESTABLISHED IN ROCK
Sven Hugo Strand, Hantverkargatan 50, Stockholm, Sweden
Filed May 26, 1960, Ser. No. 31,891
Claims priority, application Sweden June 10, 1959
1 Claim. (Cl. 85—2.4)

This invention substantially relates to bolts adapted to be anchored in a bore hole established in rock, i.e. bolts adapted to form fixing points in a rock-face or to hold together a weakened rock portion. The bolt is inserted in a hole which is bored more or less deep in the rock, and is secured there by means of expanding means. The bolt end protruding from the rock-face is threaded and provided with one or more nuts and washer. However, the invention is not limited to rock bolts but may be applied to any kind of anchoring bolts of the expansion type.

Bolts of this kind are known, in which that end of the bolt which is to be inserted in the hole, is forged to form a conical portion, two or more wedge members correspondingly shaped being arranged to glide up on the conical portion. Due to the fact that the bolt end expands in this way, the bolt grips into the hole. The difficulty lies in manipulating the bolt so that it is caused to grip in the desired place and so that it can be loosened and removed. By the invention a bolt of the general type indicated is obtained which is very simple and suitable for mass production and which is very easy to manipulate when it is desired to loosen or lock the same.

The invention is substantially characterized by a helical spring wound around the shank of the bolt and secured to one or more of the wedge members gliding on the conical portion of the bolt, and by a nib, plug or the like fixed to the shank, said nib entering between the turns of the spring and being easily glidable between said turns. If the bolt is rotated in one direction, the spring will be compressed between the nib and the wedge members and thus urge the latter to glide up on the conical portion and engage the wall of the hole over their entire surface. However, if the bolt is rotated in the opposite direction, the spring is expanded between the nib and the wedge members and the latter are thus pulled down from the conical portion, the diameter of the bolt end being thereby reduced so that the bolt easily can be drawn out from the hole.

The invention will be described more in detail below, reference being had to the accompanying drawings, in which FIG. 1 is a side view in elevation, in partial section, of the rock bolt according to the invention, while FIG. 2 shows an alternative embodiment of the spring used according to the invention. FIG. 3 shows a further embodiment of the expansion portion of the bolt. FIG. 4 shows an embodiment of a wedge in section.

The bolt 1 which may be of arbitrary length and arbitrary cross section is in its one end forged in a manner known per se to form a conus 2. Three wedges $3_{a-c}$ are arranged separately on said cone (the wedges are at least two in number, but there may be any number of them). An elastic member, e.g. a rubber band 4, which is placed in a groove in the wedges, holds the wedges together. A left-handed helical spring 5 is in its one end rigidly connected with one of the wedges 3 at 6. At a lower place on the bolt there is fixed a nib 7, e.g. by welding, or by a plug driven into a hole in the bolt. The nib enters between the turns of the spring 5, and its width is such that it easily passes between said turns. Like the conical portion the nib 7 may also be pressed out from the bolt material to form a tongue. The other end of the bolt is threaded in the usual manner at 8 and provided with nut 9 and washer 10.

The device operates in the following manner: By rotating the bolt 1 to the right in relation to the spring 5 and the wedges 3 connected therewith the latter may be caused to glide up on the cone 2. Thanks to the spring, irregularities in the hole will be of no consequence. If the hole is tapering in some place, the wedges spring away when the bolt is being introduced. The device is self-locking in the hole in the usual manner and when the nut 9 is thereafter tightened, the bolt is firmly anchored in the hole.

The mounting of the bolt in a hole may be considerably facilitated by an auxiliary member in the form of a ring 12 placed around the wedges 3, see FIG. 1. Especially when it is the question of long bolts which are to be introduced into holes with mouths difficult to get at or lying high up, e.g. in the ceiling of a rock chamber, this device is very practical. The ring 12—the outer diameter of which is somewhat greater than the inner diameter of the hole, approximately with the proportions shown in FIG. 1—is located in a rather shallow groove 13 extending around the wedges 3. By still rotating the bolt to the right in relation to the spring, the latter is compressed between the nib 7 and the wedges 3 because the latter are, by the ring 12, prevented from expanding and gliding up on the cone 2. The expansion device of the bolt is so to say "loaded," and after the bolt end has been introduced into the hole, the expansion may be released by pushing off the ring 12 against the edge 14 of the hole. The wedges now immediately glide up on the cone and engage the wall 11 of the hole, and the bolt can be introduced to the desired depth where it is locked. By tightening the nut 9 the desired bias can be obtained in the bolt.

The reversed operation, i.e. the loosening of the bolt, is just as easily performed. After the nut 9 has been removed the bolt 1 is knocked inwards. When the wedges 3 have been released, the bolt is rotated to the left. Due to the movement of the nib 7 relative to the spring 5 the wedges will be subjected to a traction force so that they glide downwards on the cone 2 and the bolt can be taken out.

FIG. 2 discloses another embodiment of the expansion members in the bolt according to the invention. Instead of connecting the spring with one of the wedges and holding the latter together by means of an elastic member 4, the spring 5' is in this case bent so that three coils or loops $5_a'$ are formed in one end. These coils or loops are riveted or secured in some other manner to the three wedges 3' at 15, as shown in FIG. 2. In this manner the wedges are held together by spring action, and no special means are required for this purpose.

The outsides of the wedges are provided with grooves or flutes in the usual manner in order to facilitate their engagement with the wall of the hole. Furthermore, the spring 5 or 5' may, of course, as well be right-handed as left-handed. However, in view of the direction in which a bolt is normally screwed in and out it is most practical that the spring is left-handed.

In the embodiment shown in FIG. 3 the conical portion at the bolt end is not forged but the bolt is in its end provided with a thread on to which there is screwed a conical sleeve. The thread is thereby dimensioned in such a way that the bolt will not be weakened, which means that at all events the core diameter of the thread is not smaller than that at the opposite end of the bolt where the nut is to be screwed on.

In this embodiment the elastic member 4 is replaced by a bent portion of the spring 5, which thereby retains the three loose wedges $3_{a-c}$ at the bolt. Naturally, the elastic member 4 may also in the embodiment disclosed in FIG. 1 be replaced by the bent portion of the spring 5.

In this embodiment the ring 12 operates in the same manner as in the other embodiments, and it may be placed in such a way that it engages one of the flutes in the outsides of the wedges, and therefore the above-mentioned shallow groove for said ring is dispensed with.

The ring 12 may be made of any suitable material, such as iron, metal, plastic or the like.

In the embodiment shown in FIG. 3 the bent spring portion is, as already mentioned, located in a groove in the wedges. These may, however, be formed in different ways, e.g. by forging according to FIG. 4, in such a manner that a narrow slot in the form of an eye is obtained around their centre line on a level with the groove, which involves the advantage that the wedges may be pushed on to the bent portion of the spring.

What I claim is:

A bolt structure adapted to be anchored in a bore hole established in rock or similar anchoring structure, comprising a cylindrical shank which is, at one end, provided with a thread of arbitrary length and, at the other end, with a conical portion tapering towards the shank, a plurality of spaced wedge-shaped members having an internal surface complementary to said conical portion and resting against said conical portion and being adapted, while cooperating with the conical portion, to engage the walls of a substantially cylindrical hole, means holding said members together whereby they can move as a unit axially of said conical portion, including a helical spring having spaced turns wound around the shank of the bolt and secured at one end to at least one of the wedge members and an outstanding lug member fixed on said shank, said lug member entering between the turns of the spring intermediate the ends thereof and being easily glidable between the turns whereby said spring may be compressed by rotation of said bolt, said bolt structure including a release device in the form of a ring-like member around the wedge members and is in engagement with said members whereby the latter are prevented from expanding prior to the ring-like member having been removed, said ring-like member extending radially beyond said wedge members to provide an abutment whereby said ring may be removed as by being pushed off against the edge of the hole.

References Cited in the file of this patent

UNITED STATES PATENTS

| 1,276,708 | Bair | Aug. 27, 1918 |
| 2,625,071 | Lewis | Jan. 13, 1953 |
| 2,753,750 | Dempsey | July 10, 1956 |

FOREIGN PATENTS

| 549,789 | Italy | Oct. 17, 1956 |